United States Patent
Zhang et al.

(10) Patent No.: US 9,396,413 B2
(45) Date of Patent: *Jul. 19, 2016

(54) CHOOSING IMAGE LABELS

(71) Applicant: Google Inc., Mountain View, CA (US)

(72) Inventors: Yong Zhang, Shanghai (CN); Charles J. Rosenberg, Cupertino, CA (US); Jingbin Wang, Mountain View, CA (US); Sean O Malley, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,660

(22) Filed: Nov. 13, 2015

(65) Prior Publication Data

US 2016/0070990 A1 Mar. 10, 2016

Related U.S. Application Data

(63) Continuation of application No. 13/486,167, filed on Jun. 1, 2012, now Pat. No. 9,218,546.

(51) Int. Cl.
    *G06K 9/68* (2006.01)
    *G06K 9/62* (2006.01)
    *G06K 9/74* (2006.01)
    *G06F 17/30* (2006.01)
    *G06K 9/52* (2006.01)

(52) U.S. Cl.
    CPC .......... *G06K 9/6267* (2013.01); *G06F 17/3053* (2013.01); *G06F 17/30253* (2013.01); *G06K 9/52* (2013.01); *G06K 9/6201* (2013.01); *G06K 9/6202* (2013.01); *G06K 9/6218* (2013.01); *G06K 9/68* (2013.01); *G06K 9/74* (2013.01)

(58) Field of Classification Search
    CPC ................... G06F 17/30265; G06F 17/30247; G06F 17/3069; G06F 17/30256; G06F 17/30876; G06F 17/30277; G06F 17/30598; G06F 17/30657; G06F 17/30011; G06F 17/30327; G06F 17/30793; G06F 17/30244; G06F 17/301; G06F 17/30262; G06F 17/30864; G06F 17/30259; G06K 9/6269; G06K 9/6297; G06K 9/6202; G06K 9/00463; G06K 9/6255; G06K 9/00483; G06K 2009/4666; G06K 9/6218; G06N 5/02; G06N 5/00; G06N 99/005; G06Q 50/01; G06Q 30/0201; Y10S 707/99933; Y10S 707/99935; Y10S 707/99937
    USPC ......... 382/100, 155, 159, 168, 170, 190, 195, 382/224, 218
    See application file for complete search history.

(56) References Cited

U.S. PATENT DOCUMENTS 5,594,809 A * 1/1997 Kopec .................. G06K 9/6297
                                                       382/161
5,883,986 A * 3/1999 Kopec ...................... G06K 9/72
                                                       382/155

(Continued)

*Primary Examiner* — Vu Le
*Assistant Examiner* — Aklilu Woldemariam
(74) *Attorney, Agent, or Firm* — Fish & Richardson P.C.

(57) ABSTRACT

Methods, systems and apparatus for choosing image labels. In one aspect, a method includes receiving data specifying a first image, receiving text labels for the first image, receiving search results in response to a web search performed using at least some of the text labels as queries, ranking the text labels, at least in part, based on a number of resources referenced by the received search results, wherein at least some of the resources each include an image matching the first image, and selecting an image label for the image from the ranked text labels, the image label being selected based on the ranking.

13 Claims, 5 Drawing Sheets

(56) References Cited

U.S. PATENT DOCUMENTS

| | | | | |
|---|---|---|---|---|
| 5,933,600 | A * | 8/1999 | Shieh | H04L 29/06 709/219 |
| 6,064,747 | A * | 5/2000 | Wills | B23C 3/35 382/100 |
| 6,397,213 | B1 * | 5/2002 | Cullen | G06F 17/30017 |
| 6,961,463 | B1 * | 11/2005 | Loui | G06T 7/20 382/170 |
| 7,039,856 | B2 * | 5/2006 | Peairs | G06F 17/30707 706/15 |
| 7,840,076 | B2 * | 11/2010 | Bouguet | G06F 17/30256 382/224 |
| 7,903,882 | B2 * | 3/2011 | Nagasaka | G06F 17/30265 382/224 |
| 8,429,173 | B1 * | 4/2013 | Rosenberg | G06F 17/30247 707/748 |
| 2004/0101156 | A1 * | 5/2004 | Kacker | G11B 27/031 382/100 |
| 2004/0119759 | A1 * | 6/2004 | Barros | G06F 17/30241 715/853 |
| 2006/0036577 | A1 * | 2/2006 | Knighton | G06F 17/30247 |
| 2007/0047819 | A1 * | 3/2007 | Hull | G06K 9/00456 382/190 |
| 2007/0136235 | A1 * | 6/2007 | Hess | G06F 17/30997 |
| 2008/0189270 | A1 * | 8/2008 | Takimoto | G06F 17/30265 |
| 2010/0082692 | A1 * | 4/2010 | Akinyemi | G06F 19/3443 707/797 |
| 2011/0184932 | A1 * | 7/2011 | Hennum | G06F 17/30991 707/711 |
| 2013/0121589 | A1 * | 5/2013 | Gokturk | G06F 17/30253 382/195 |
| 2015/0169999 | A1 * | 6/2015 | Duerig | G06K 9/6256 382/159 |

* cited by examiner

CHOOSING IMAGE LABELS

CROSS-REFERENCE TO RELATED APPLICATIONS

This application is a continuation application of, and claims priority to, U.S. patent application Ser. No. 13/486,167, titled "Choosing Image Labels," filed on Jun. 1, 2012. The disclosure of the foregoing application is incorporated herein by reference in its entirety for all purposes.

BACKGROUND

This specification relates to data processing and choosing image labels.

A search processing operation that provides search results responsive to a query image can provide information of interest to a user about the query image. For example, the search processing operation can find information available on the Internet describing the image, such as an origin, creator, or artist of an image; other versions of the image such as cropped, edited, or different resolution versions of the image; companies, organizations, or other entities related to the image, e.g., if the image is a logo, news stories related to the image; or identities of subjects of an image such as buildings or objects portrayed in the image. One way to find information available on the Internet describing the image is to perform a text search using as a query a text label describing the image. An image annotator can be used to identify text labels describing the image.

SUMMARY

In general, in one aspect, a method includes receiving data specifying a first image, receiving text labels for the first image, receiving search results in response to a web search performed using at least some of the text labels as queries, ranking the text labels, at least in part, based on a number of resources referenced by the received search results, wherein at least some of the resources each include an image matching the first image, and selecting an image label for the image from the ranked text labels, the image label being selected based on the ranking.

Implementations of this aspect may include one or more of the following features. Receiving text labels for the first image includes requesting text labels associated with images identified as near duplicate images of the first image. The aspect includes ranking the received text labels by assigning a score to each text label and incrementing the score for each instance of another text label that is identified as being a near duplicate text label of the text label. The resources matching the first image include resources containing an image identified as a near duplicate image of the first image. The resources matching the first image include resources containing an image identified as residing in a cluster of a database containing the first image. The aspect includes outputting a highest ranked text label as responsive to the first image. The data specifying the first image is received from a user device, and the received text labels are identified based on characteristics of a user of the user device. Ranking the text labels includes assigning a text label ranking score to each of the text labels, and arranging the text labels according to the assigned score. Ranking the text labels includes calculating a text label ranking score for each text label based on a median search result score calculated according to search result scores associated with the search results, a number of search results returned by the web search, and an original rank position of the received text labels. Ranking the text labels includes calculating a text label ranking score for each text label based on the formula: median_score*log(1+max(1, docs_matched))*smoothing_factor/(smoothing_factor+original_rank_position), wherein median_score specifies a median search result score calculated according to search result scores associated with the search results, docs_matched specifies a number of search results returned by the web search, smoothing_factor is a constant value, and original_rank_position specifies an original rank position of the received text labels.

Particular implementations of the subject matter described in this specification can be implemented so as to realize one or more of the following advantages. A text label can be chosen as a descriptor for an image. The text label can be used to perform a web search for content relevant to the image.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

One way that a search processing operation can find information related to a query image is to identify a text label describing the query image and perform a textual web search using the text label as a query. For example, the search processing operation could maintain a database that associates images with text labels and use the database to identify a text label that matches the query image. This database could also associate images with other images by clustering the images together according to visual features common to the images.

The text label that best matches the query image can be identified by compiling a list of text labels that are associated with images that have been determined to be visually similar to the query image. Then, the list can be re-ordered according to which text labels occur most frequently in this list, so that the most likely candidates for the best text label are at the top of the list. Next, the search processing operation can perform a web search using the candidates for the best text label as queries and pare down or filter the search results based on whether the search results include web pages that contain images that have been identified as near-duplicate images to the query image, or images clustered to a same group as the near-duplicate images within the database of images. The list of candidates for the best text label can be re-ordered again based on how many pared-down search results were returned for that label. The text label at the top of the re-ordered list can be selected as a top candidate for the text label that best matches the query image.

Figure 1:
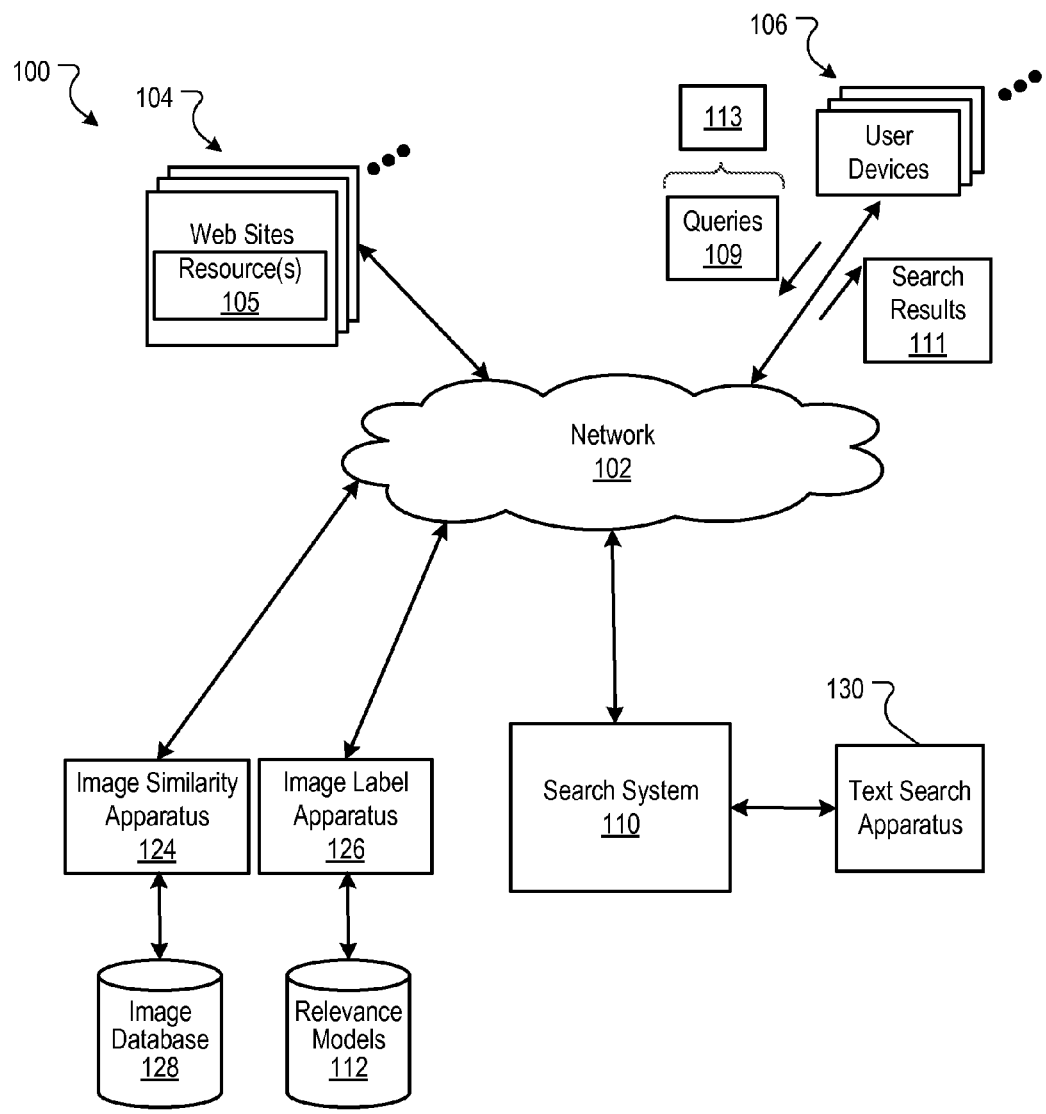
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many web sites 104 and user devices 106, which are also sometimes referred to as client devices.

A web site 104 is a facility containing one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data that can be provided by the web site 104 over the network 102 and that is associated with a resource address. Resources 105 include HTML pages, word processing documents, and portable document format (PDF) documents, images, video, and feed sources, to name just a few. The resources can include content, e.g., words, phrases, images and sounds and may include embedded information, e.g., meta information and hyperlinks, and/or embedded instructions, e.g., scripts. In some examples, one resource 105 can contain or reference another resource 105. For example, an HTML page can reference an image.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources 105 provided by the web sites 104. Data about the resources 105 can be indexed based on the resource 105 to which the data corresponds.

The user devices 106 submit search queries 109 to the search system 110. In response, the search system 110 identifies resources 105 that are responsive to, e.g., have at least a threshold relevance score for, the search query 109. The search system 110 generates search results 111 that identify the resources 105 and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page. For example, the search queries 109 can be submitted during user sessions in which a user of a user device 106 enters search queries into a user interface. During a user session, the user can be presented with search results 111.

The user devices 106 can receive the search results 111, e.g., in the form of one or more web pages, and render the web pages for presentation to users. In response to the user selecting a link in a search result 111 at a user device 106, the user device 106 requests the resource 105 identified by the link. The web site 104 hosting the resource 105 receives the request for the resource 105 from the user device 106 and provides the resource 105 to the requesting user device 106. In some examples, the search system 110 can also generate search queries 109 for which search results 111 are generated. For example, the search system 110 can receive a search query 109 that includes an image. The search system 110 can then determine a text label that has been identified as relevant to the image, and use the text label as a search query 109 to receive search results 111 relevant to the image.

Search results 111 can be ranked based on scores related to the resources 105 identified by the search results 111, such as information retrieval ("IR") scores, and optionally a quality score of each resource relative to other resources 105. In some implementations, the IR scores are computed from dot products of a feature vector corresponding to a search query 109 and feature vectors of resources 105, and the ranking of the search results 111 is based on relevance scores that are a combination, e.g., sums, products, or other mathematical combinations, of the IR scores and quality scores. In some examples, the search results 111 can be ordered at least partially according to these relevance scores and provided to the user device according to the order.

In some implementations, a search query 109 can include data for a single query type or for two or more query types, e.g., types of data in the query. For example, the search query 109 may have a text portion, and the search query 109 may also have an image portion. A search query 109 that includes data for two or more query types can be referred to as a "hybrid query." In some examples, a search query 109 includes data for only one type of query. For example, the search query 109 may only include image query data, e.g., a query image, or the search query may only include textual query data, e.g., a text query.

In some examples, the search query 109 includes a query image 113. In some implementations, the search system 110 returns search results 111 responsive to the query image 113. For example, the search results 111 could be responsive to a textual query describing the query image 113.

In some implementations, the search system 110 includes a text search apparatus 130 that is used to perform a search based on a textual input. For example, the text search apparatus 130 can perform a search based on a label for an image, which is referred to as an image label.

An image label ("label") is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image, e.g., visually depicted in the image, or otherwise associated with the image, e.g., text included in a file name, text included in anchor text of a link to the image, or resource location of the image.

An image label apparatus 126, sometimes called an image annotator, is a data processing apparatus that can generate labels for images. The image label apparatus 126 can receive an image such as a query image 113 as input. The image label apparatus 126 can return one or more labels that describe a topic of or are otherwise semantically related to the image. In some implementations, the image label apparatus 126 can identify a label that is semantically related to an image because the image label apparatus 126 may already store data describing the image and/or data indicating which labels are semantically related to the image. The image label apparatus 126 can identify a label that is semantically related to an image because the image label apparatus 126 may store data associating visual features of images with labels.

In some examples, the image label apparatus 126 can interact with an image relevance model 112 to identify a label for an image based on visual features of the image. The image label apparatus 126 can provide the image to an image relevance model 112 that has been created for a particular label to determine the degree to which the image is relevant to the particular label. When the image relevance model 112 receives an image as input, the image relevance model 112 can output a relevance score indicating the degree to which the input image is related to the particular label corresponding to the image relevance model 112.

In some examples, the environment 100 also includes an image similarity apparatus 124. The image similarity apparatus 124 can receive an image as input and identify other images that are visually similar to the image. In some implementations, images can be identified as visually similar if the images have similar sets of visual features, such as similar colors, brightness, shapes, edge locations, and/or other similar attributes. For example, images of a sunrise will likely share similar colors, e.g., of a sky at sunrise, and shapes, e.g., of a sun appearing on the horizon. The attributes identified by the image relevance model 112 can be used to further identify other images sharing the same common features. The image similarity apparatus 124 may include or be in communication with an image database 128 that contains information about images and stores, information identifying images that are included in image clusters. For example, the image database 128 may cluster together images having similar sets of visual features such as near duplicate images.

In some examples, the images in the image database 128 are clustered based on their content feature values, i.e., values indicative of visual features of the image and/or other image features. The content feature values can be extracted for each image represented in the image database 128. The content feature values can be transformed into a sparse representation using a pre-computed dictionary of visual terms that represent a set of regions having similar content feature values. The extraction and transformation yields a "bag of features" for the image. Generally, the content feature values of an image quantitatively represent visual features of the image. Because the content feature values are represented as numerical values, a mathematical calculation can be performed to determine a degree of similarity between content feature values of two images. Two images having content feature values meeting a threshold degree of similarity can be clustered together in the image database 128. Note that other techniques can be used to cluster images that are considered visually similar.

The image similarity apparatus 124 can be configured to identify images that are near duplicate images relative to an image received by the image similarity apparatus 124 as input. In some implementations, near duplicate images are images that are identical except for differences in the way the images have been processed. In some examples, the differences between two near duplicate images are differences other than differences in visual features of the images. As one example, two identical images at different resolutions are near duplicate images. As another example, two images of the same object having different brightness, contrast, or other image attributes, e.g., image attributes adjusted in image processing software, can be near duplicate images. As another example, an uncropped version of an image and a cropped version of the same image, e.g., cropped to remove a border in the image, can be near duplicate images. Images can be identified as near duplicate images if they satisfy a similarity threshold, e.g., a similarity score determined by the image similarity apparatus 124 that exceeds a similarity threshold.

The image similarity apparatus 124 can be used to identify images of a resource 105, for example, images contained in or referenced by a web page, which match an image received as a portion of a search query 109. An image contained in a web page can be said to match a query image 113 if the images are near duplicate images according to the image similarity apparatus 124.

Figure 2:
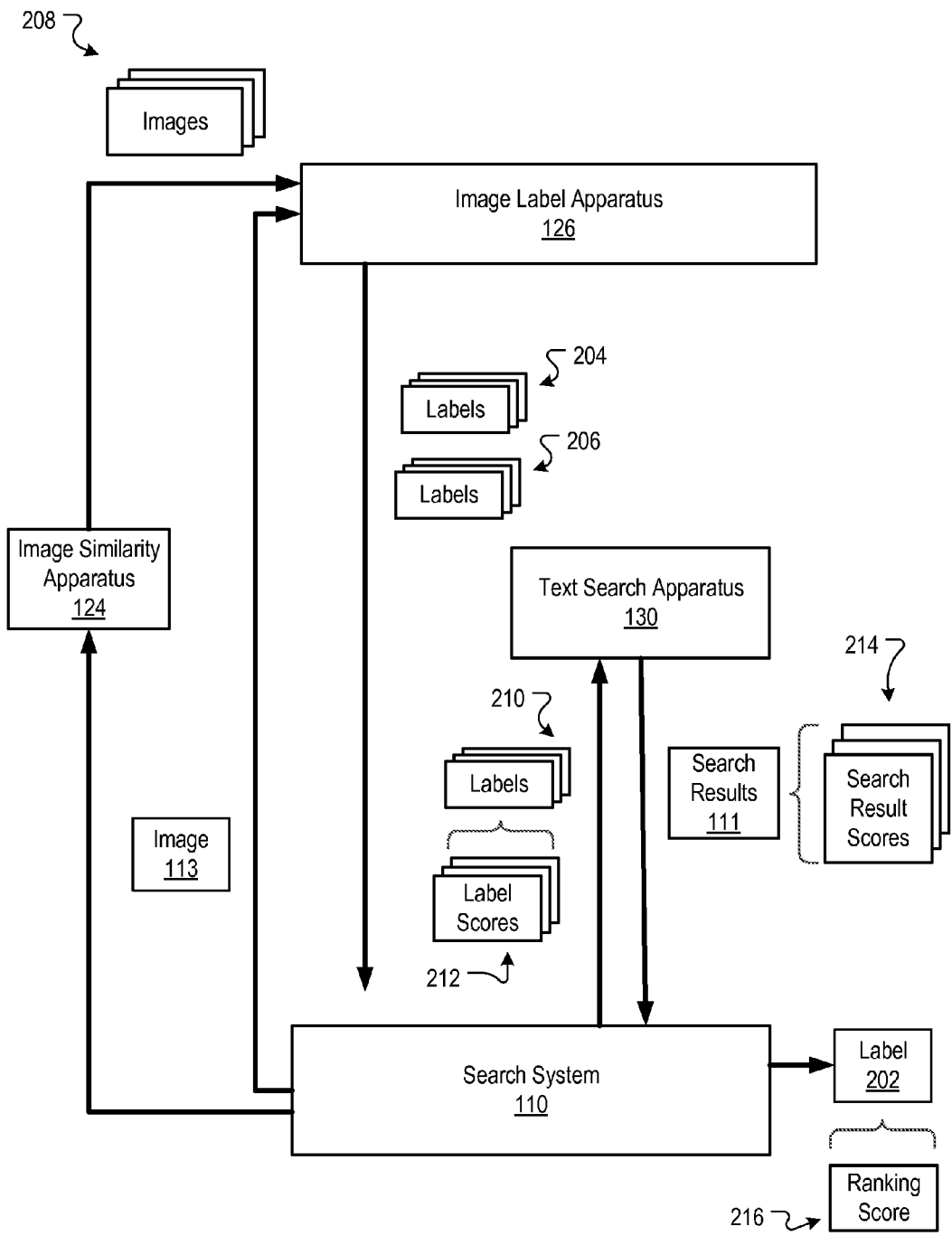
FIG. 2 is a block diagram showing an example data flow for selecting a label that describes a query image.

FIG. 2 is a block diagram showing an example data flow for selecting a label 202 that describes a query image 113. For example, the label that describes the query image 113 can be the label that best describes the query image 113. Here, a label that best describes an image is one that, when used as a textual search query, returns results most relevant, or having at least a threshold measure of relevance, to the query image 113. Put another way, the best label can be a label that is considered to have at least a threshold likelihood of, e.g., most likely to, accurately describing the query image 113. As shown in FIG. 2, the search system 110 interacts with related components to choose a text label. In some implementations, components other than the components shown here can undertake the same or similar operations to choose a text label.

The search system 110 provides the query image 113 to an image label apparatus 126. For example, the query image 113 may have been received as a portion of a search query 109 submitted by a user device 106 as shown in FIG. 1. The image label apparatus 126 returns labels 204 that are considered descriptive of the query image 113. For example, if the query image 113 is supplied to an image relevance model 112 (FIG. 1) corresponding to the label 204 and the image relevance model 112 returns an image relevance score greater than a threshold, then the label 204 can be said to describe the query image 113.

In some implementations, the labels 204 are selected by the image label apparatus 126 based on visual features of the query image 113. In some examples, the labels 204 may each correspond to image relevance models that weight visual features based on the corresponding label, so that visual features found in images identified as matching the label are weighed higher in the image relevance model. The image label apparatus 126 may have identified those same, or similar, visual features in the query image 113. In some examples, the label 204 may be associated with the particular query image 113 in data stored by the image label apparatus 126 associating images with labels.

In some examples, the labels 204 are ranked by the image label apparatus 126. For example, the image label apparatus 126 may provide the labels 204 in the form of an ordered list, with the label most likely to accurately describe the query image 113 at the highest position in the list and the label least likely to accurately describe the query image 113 at the lowest position in the list. The labels 204 are provided to the search system 110.

In some examples, the labels 204 are chosen based on characteristics of a user of the user device 106 (FIG. 1) who submitted the query image 113. For example, if the user is identified as speaking a particular language, labels 204 can be chosen in the user's language. In some examples, the user indicates that he prefers a particular language, for example, in a user profile of the user stored by the search system 110. In some examples, the user may be identified as speaking a particular language based on a location of the user, for example, an indication by the user that he or she resides in a particular country. Other characteristics of a user, for example, characteristics specified by the user, can be used to select the labels 204.

In some implementations, the search system 110 also provides the query image 113 to the image similarity apparatus 124. The image similarity apparatus 124 returns near duplicate images 208 of the query image 113. In some examples, the image similarity apparatus 124 returns information describing the near duplicate images 208, such as image identifiers or references to the near duplicate images 208. The near duplicate images 208 may be images that have some or all of the same visual features as the query image 113. In some examples, the near duplicate images 208 can also be provided to the image label apparatus 126. In response, the image label apparatus 126 can identify labels 206 describing the near duplicate images 208 and return those labels 206 to the search system 110.

If the search system 110 receives both sets of labels 204, 206, the search system 110 can merge the two sets into a single merged set of labels 210. In some examples, some of the labels 204 describing the query images 113 also appear among the labels 206 describing the near duplicate images 208. When the search system 110 merges the two sets of labels 204, 206, the search system 110 can determine the number of occurrences of the same label among the sets of labels 204, 206. Upon generating a merged set of labels 210, the search system can assign label scores 212 to each of the labels 210. The label score 212 of each label 210 represents the number of times a particular label appeared in the sets of labels 204, 206. For example, if a particular label was returned for three near duplicate images 208 then that particular label may be assigned a score of three.

In some examples, the merged set of labels 210 will include labels that are near duplicates of each other. Two labels are near duplicates of each other if the labels meet a similarity condition. One example of a similarity condition is whether two labels differ by less than a threshold quantity of characters. For example, if the threshold quantity of characters is one, then the label "cat" is a near duplicate label to the label "cats."

Another example of a similarity condition is whether two labels are identical except for one or more identified stop words. A stop word is a word that appears often in labels but does not change the semantic meaning of the label. For example, stop words may include words such as prepositions or articles, or words that appear often in labels such as "pictures" or "images." Thus, the labels "cats," "pictures of cats," and "cats images" may all be near duplicate labels of each other.

The search system 110 can remove near duplicate labels in the merged set of labels 210, leaving one label representing the other near duplicate labels, and increment the label score 212 associated with the remaining label by the number of near duplicate labels removed. Thus, if the labels "pictures of cats," and "cats images" are removed, then the label score 212 associated with the label "cats" can be incremented by two. Although in the example described here the label score 212 is first calculated based on occurrences of the same label being returned for near duplicate images, and then incremented based on near duplicate labels, in some examples, the label score 212 is first calculated based on near duplicate labels, and then incremented based occurrences of the same label being returned for near duplicate images. Once the label score 212 is calculated for each label, the merged set of labels 210 can be re-ranked. For example, if the set of labels 210 is an ordered list, the set of labels 210 can be re-ranked so that labels having a higher label score appear higher in the list and labels having a lower label score appear lower in the list.

The search system 110 then provides the merged set of labels 210 to the text search apparatus 130 as text queries. The text search apparatus 130 performs a search of online resources 105 (FIG. 1) using the set of labels 210. For example, the online resources 105 can include web pages responsive to a particular label. The text search apparatus 130 then provides search results 111 back to the search system 110.

In some implementations, the search results 111 can be filtered based on the resources 105 referenced by the search results 111. In some examples, the search results 111 can be filtered to include only those search results that reference resources 105 containing the query image 113 and/or one of the near duplicate images 208. For example, if a particular web page referenced by the search results 111 does not contain the query image 113 or one of the near duplicate images 208 then the search result referencing that web page can be excluded from the search results 111.

In some examples, the search results 111 can be filtered to reference resources 105 containing an image belonging to the same cluster as the query image 113 in an image database. Image clusters are described in more detail in FIG. 3. The search results 111 can be filtered by the search system 110, the text search apparatus 130, or another apparatus. In this way, the search results 111 can be filtered such that the resources 105 referenced by the search results 111 are more likely to be relevant to the query image 113 than if the search results 111 were not filtered.

The search system 110 can use the search results 111 to re-order the merged set of labels 210. In some examples, the search results 111 are each associated with a search result score 214. A search result score 214 is a numerical value that indicates the degree to which a particular search result is relevant to the original search query. In some implementations, the search system could calculate a median search result score 214 and order the merged set of labels 210 according to the median search result score 214 for each label 210. In some implementations, the search system could order the merged set of labels 210 according to the total number of search results 111 returned for each label 210.

In some examples, the search system 110 assigns a ranking score 216 to each label in the merged set of labels 210. A ranking score 216 is a numerical value that can be calculated by the search system 110 based on measures indicative of the degree to which a label describes an image. In this way, the ranking score 216 for a label indicates how well the label describes the image. A label in the set of labels 210 having the highest ranking score 216 can be said to be the label that best describes the image corresponding to the label.

The ranking score 216 can be calculated based on multiple variables. In some examples, the ranking score 216 is calculated based on the median search result score calculated according to search result scores 214 associated with the search results 111 for a particular label 210. In some examples, the ranking score 216 is calculated based on the number of search results 111 returned for a particular label 210. In some examples, the ranking score 216 is calculated based on the original rank position of the labels 210, for example, as the labels were ranked according to label scores 212.

In some implementations, the ranking score 216 for a label 210 can be calculated based on the following equation, in which median_score specifies the median search result score calculated according to search result scores 214 associated with the search results 111 returned for this label 210, docs_matched specifies a number of search results 111 returned by the web search carried out for this label 210, which may be filtered search results 111, smoothing_factor is a constant value chosen based on experimental data, and original_rank_position specifies an original rank position of the labels 210:

$$ranking\_score = \frac{median\_score \times \log(1 + \max(1, docs\_matched)) \times smoothing\_factor}{smoothing\_factor + original\_rank\_position}$$

Once the ranking score 216 is calculated for each label in the merged set of labels 210, the label 202 having the highest ranking score 216 can be chosen as most responsive to the query image 113, or, put another way, the label 202 that best describes the query image 113.

Figure 3:
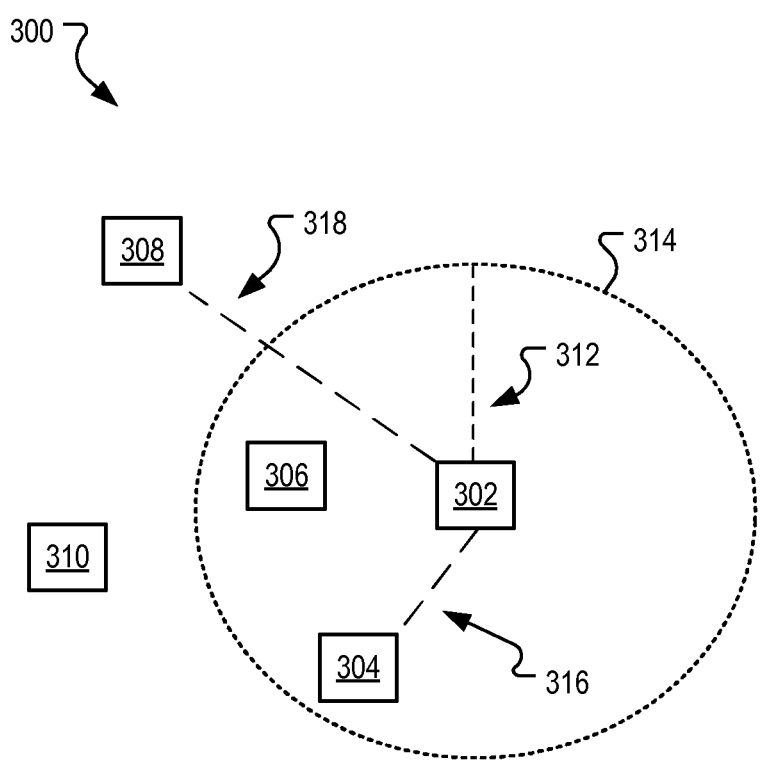
FIG. 3 is an example spatial representation of a portion of an image database.

FIG. 3 is an example spatial representation 300 of visual distances between images in a portion of an image database. For example, the image database could be the image database 128 shown in FIG. 1. The portion of the image database shown includes five images 302, 304, 306, 308, 310. In this example spatial representation 300, images are closer to each other if they share more visual features in common, and farther in distance from each other if they share fewer visual features in common. Thus, the relative distance between two images is a representation of how many visual features they share in common, relative to other images.

Images that share a threshold quantity of visual features in common can be said to be in a same cluster. In the example spatial representation 300 images that are separated by less than a chosen spatial distance are within a same cluster. For example, one image 302 is closer to some images and farther away from other images. A distance 312 from the image 302 can be chosen as the threshold between images clustered with the image 302 and images not clustered with the image 302. Images within a circle 314 defined by the distance 312 are clustered in a same cluster with the image 302. Put another way, the circle 314 defines a cluster of images based on the first image 302. One image 304 is within the circle 314 because it is a distance 316 from the first image 302 less than the threshold distance 312. Thus, that image 304 is clustered with the first image 302. Another image 308 is not within the circle 314 because it is a distance 318 from the first image 302 greater than the threshold distance 312. Thus, that image 308 is not clustered with the first image 302.

Because images 304, 306 that are clustered with the first image 302 share a threshold quantity of visual features in common with the first image 302, the images 304, 306 may represent similar subjects as the first image 302. For example, the images 304, 306 may portray the same buildings, objects, or other subjects. As described above with respect to FIG. 2, search results 111 can be filtered to only include resources 105 that contain an image 302, for example, a query image 113, and other images 304, 306 clustered with that image. In this way, the search results 111 will be filtered to include resources 105 that are likely to be relevant to the image 302.

Figure 4:
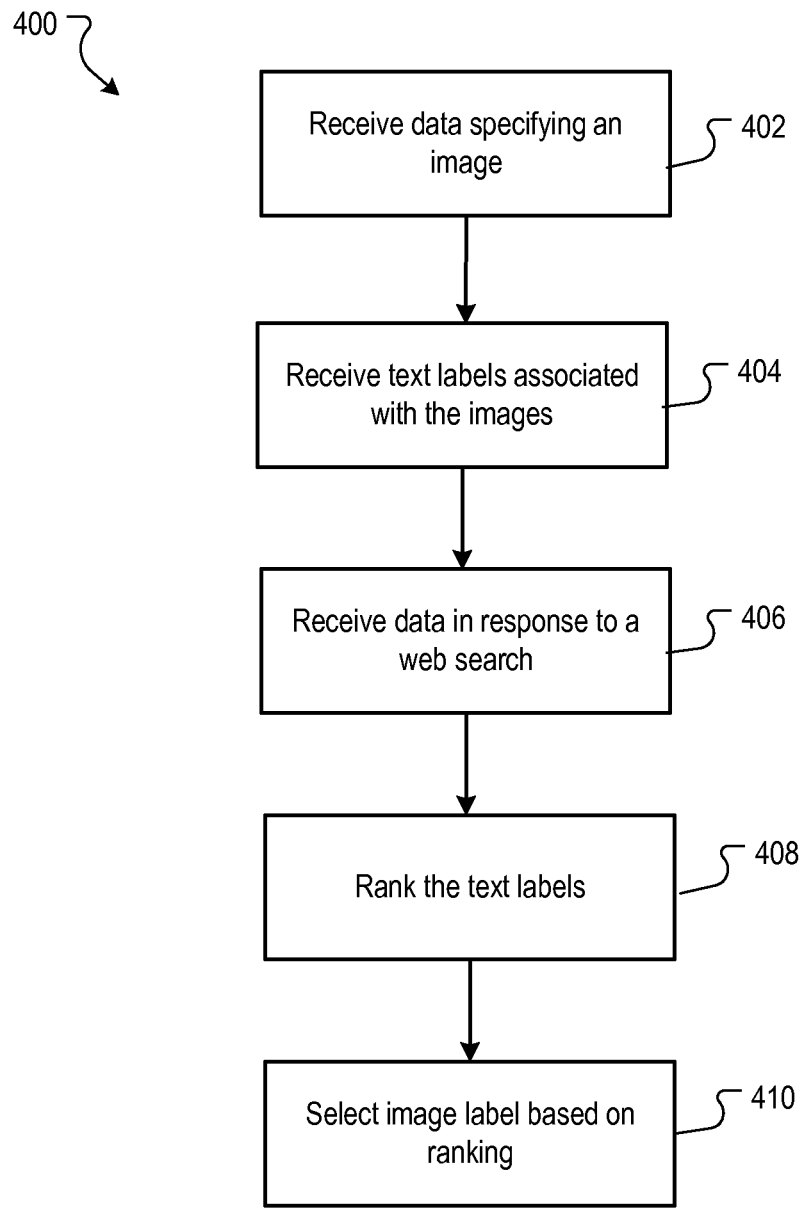
FIG. 4 is a flowchart of an example process for choosing a label for an image.

FIG. 4 is a flowchart of an example process 400 for choosing a label for an image. The operations of the process 400 can be performed, for example, by a search system 110 (FIG. 1).

At operation 402, data specifying an image is received. For example, the image could be an image submitted as part of a search query 109 (FIG. 1). The data could be, for example, a location of the image such as a uniform resource locator pointing to a location at which the image is stored. In some examples, the data could be the image itself arranged in a file format for images.

At operation 404, text labels associated with the specified image are received. For example, the specified image may be provided to an image label apparatus 126 (FIG. 1) that returns labels identified as relevant to the image. In some examples, the labels are identified as relevant to an image that is a near duplicate image of the specified image. In some implementations, the text labels may be ranked in an order based on the relevance of the text label to the specified image.

At operation 406, data is received in response to a web search. The web search can be performed using the received text labels as individual search queries. For example, a text search apparatus 130 (FIG. 1) can carry out the search. The data may be in the form of search results 111 referencing resources 105 determined to be relevant to a corresponding search query. In some examples, the search results 111 can be filtered so that the referenced resources 105 are relevant to the specified image. For example, resources 105 matching the specified image may be identified, and resources 105 not matching the specified image can be removed. A resource 105 may match the specified image if the resource contains the specified image, or the resource contains a near duplicate image of the specified image, or the resource 105 contains an image clustered with the specified image in an image database.

At operation 408, the text labels are ranked. The text labels can be ranked based on a number of resources referenced by the received data that include an image matching the specified image. In some examples, an image matches the specified image if the two images contain identical data or at least a threshold visual similarity. In some examples, an image matches the specified image if the images are near duplicates of each other. In some examples, an image matches the specified image if the two images are in the same cluster. In some implementations, the resources can be resources referenced by the search results. In some examples, the text labels can be scored and ranked based on their score. For example, the score can be calculated based on variables such as a median search result score calculated according to search result scores associated with the search results for a particular label, or based on the number of search results returned for a particular label, or based on an original rank position of the text labels.

At operation 410, an image label for the image can be selected from the ranked text labels. The image label is selected based on the ranking. For example, the image label can be the highest ranked text label. The highest ranked text label can be said to be the text label determined to be most relevant to the specified image. The selected image label can be output as the text label responsive to the specified image. The selected image label can be used as a text query to perform a text-based search, and the results of this search can be returned as responsive to a search performed using the specified image as a query image.

Figure 5:
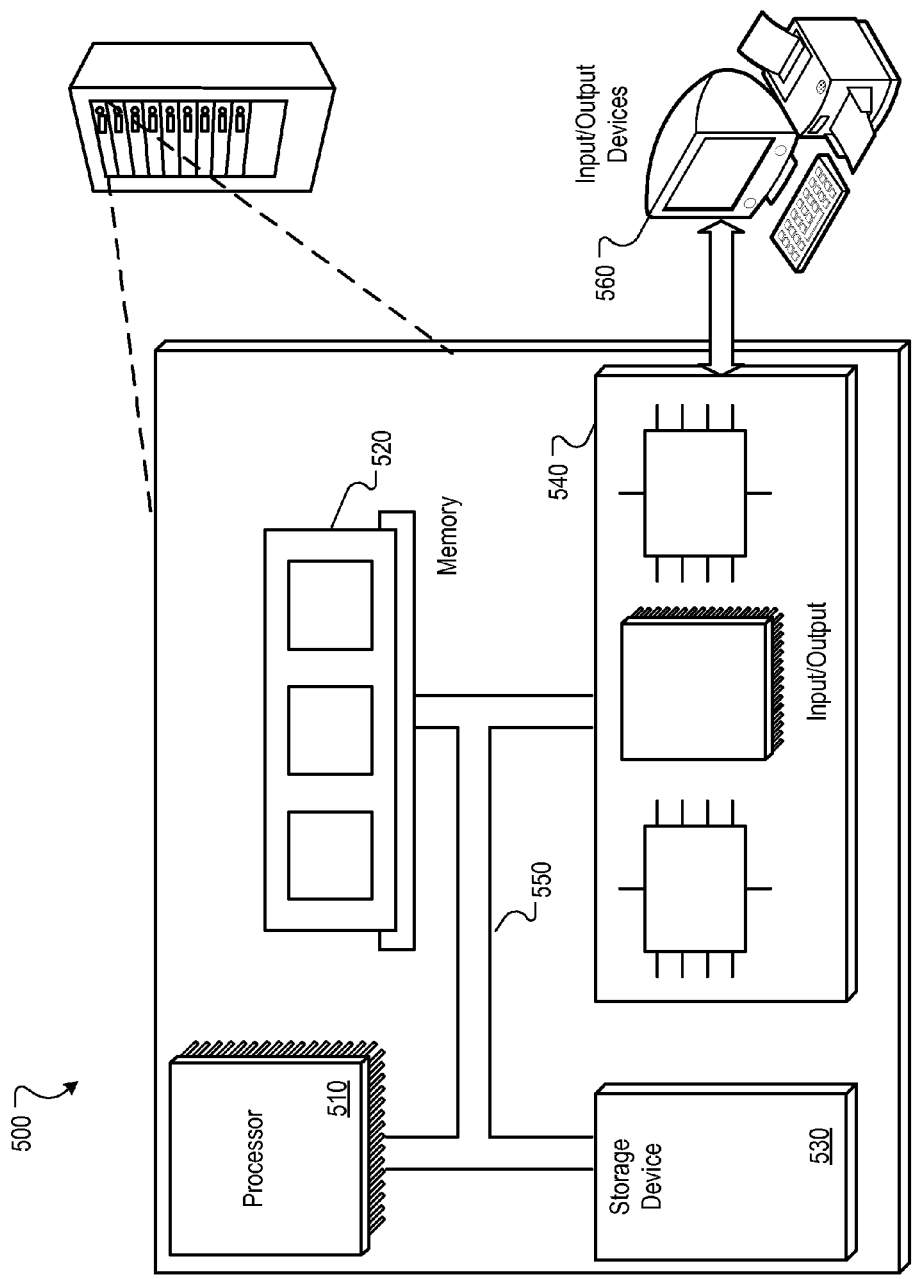
FIG. 5 is a block diagram of an example computer system.

FIG. 5 is a block diagram of an example computer system 500. For example, the system 500 could be a system or a portion of a system executing the search system 110 or other systems shown in FIG. 1. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/ output device 540 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network, "LAN", and a wide area network, "WAN", an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by a data processing apparatus, data specifying a first image;
receiving, by the data processing apparatus, text labels for the first image;
for each of one or more of the text labels:
receiving, by the data processing apparatus, data describing a set of web resources that each have at least a threshold relevance score that measures the relevance of the web resource to the text label;
assigning, by the data processing apparatus, a text label ranking score to the text label based on a number of the resources in the set of web resources that include an image matching the first image;
ranking, by the data processing apparatus, the text labels, at least in part, based on the text label ranking scores assigned to text labels; and
selecting, by the data processing apparatus, an image label for the first image from the ranked text labels, the image label being selected based on the ranking.

2. The computer-implemented method of claim 1, wherein receiving text labels for the first image includes requesting text labels associated with images identified as near duplicate images of the first image.

3. The computer-implemented method of claim 1, wherein assigning a text label ranking score comprises incrementing the score for each instance of another text label that is identified as being a near duplicate text label of the text label.

4. The computer-implemented method of claim 1, further comprising outputting a highest ranked text label as responsive to the first image.

5. The computer-implemented method of claim 1, wherein:
the data specifying the first image is received from a user device, and
the received text labels are identified based on characteristics of a user of the user device.

6. The computer-implemented method of claim 1, wherein ranking the text labels includes arranging the text labels according to the corresponding text label ranking scores.

7. A system, comprising:
a data processing apparatus; and
a memory coupled to the data processing apparatus having instructions stored thereon which, when executed by the data processing apparatus cause the data processing apparatus to perform operations comprising:
receiving data specifying a first image;
receiving text labels for the first image;
for each of one or more of the text labels:
receiving data describing a set of web resources that each have at least a threshold relevance score that measures the relevance of the web resource to the text label;
assigning a text label ranking score to the text label based on a number of the resources in the set of web resources that include an image matching the first image;
ranking the text labels, at least in part, based on the text label ranking scores assigned to text labels; and
selecting an image label for the first image from the ranked text labels, the image label being selected based on the ranking.

8. The system of claim 7, wherein receiving text labels for the first image includes requesting text labels associated with images identified as near duplicate images of the first image.

9. The system of claim 7, wherein assigning a text label ranking score comprises incrementing the score for each instance of another text label that is identified as being a near duplicate text label of the text label.

10. The system of claim 7, the operations further comprising outputting a highest ranked text label as responsive to the first image.

11. The system of claim 7, wherein:
the data specifying the first image is received from a user device, and the received text labels are identified based on characteristics of a user of the user device.

12. The system of claim 7, wherein ranking the text labels includes arranging the text labels according to the corresponding text label ranking scores.

13. Non-transitory computer readable media storing software comprising instructions executable by a processing device and upon such execution cause the processing device to perform operations comprising:
  receiving data specifying a first image;
  receiving text labels for the first image;
  for each of one or more of the text labels:
    receiving data describing a set of web resources that each have at least a threshold relevance score that measures the relevance of the web resource to the text label;
    assigning a text label ranking score to the text label based on a number of the resources in the set of web resources that include an image matching the first image;
  ranking the text labels, at least in part, based on the text label ranking scores assigned to text labels; and
  selecting an image label for the first image from the ranked text labels, the image label being selected based on the ranking.

* * * * *